United States Patent
Economy et al.

(10) Patent No.: US 6,517,906 B1
(45) Date of Patent: Feb. 11, 2003

(54) ACTIVATED ORGANIC COATINGS ON A FIBER SUBSTRATE

(75) Inventors: James Economy, Urbana, IL (US); Christian Mangun, Urbana, IL (US); Zhongren Yue, Urbana, IL (US)

(73) Assignee: Board of Trustees of University of Illinois, Urbana, IL (US)

( * ) Notice: Subject to any disclaimer, the term of this patent is extended or adjusted under 35 U.S.C. 154(b) by 5 days.

(21) Appl. No.: 09/599,084

(22) Filed: Jun. 21, 2000

(51) Int. Cl.⁷ ................................................ B05D 3/02
(52) U.S. Cl. ..................... 427/392; 427/372.2; 502/416
(58) Field of Search .................... 427/389.8, 389.9, 427/391, 392, 393.5; 502/425, 416, 424, 426, 417

(56) References Cited

U.S. PATENT DOCUMENTS

| | | | |
|---|---|---|---|
| 4,045,338 A | 8/1977 | Miyamoto et al. ............ 210/36 |
| 4,256,607 A | 3/1981 | Yoshida et al. | |
| 4,265,768 A | 5/1981 | Beasley et al. ............. 210/682 |
| 4,285,831 A | * 8/1981 | Yoshida et al. ............. 252/423 |
| 4,362,646 A | 12/1982 | Ikegami et al. | |
| 4,760,046 A | 7/1988 | Burger et al. | |
| 5,039,651 A | 8/1991 | Kosaka et al. | |
| 5,102,855 A | 4/1992 | Greinke et al. | |
| 5,162,286 A | 11/1992 | MacDowall | |
| 5,204,310 A | 4/1993 | Tolles et al. | |
| 5,206,207 A | 4/1993 | Tolles | |
| 5,212,144 A | 5/1993 | Schwartz, Jr. | |
| 5,250,491 A | 10/1993 | Yan | |
| 5,276,000 A | 1/1994 | Matthews et al. | |
| 5,304,527 A | 4/1994 | Dimitri | |
| 5,318,846 A | 6/1994 | Bruening et al. ........... 428/375 |
| 5,350,523 A | 9/1994 | Tomoi et al. ................ 210/683 |
| 5,416,056 A | 5/1995 | Baker | |
| 5,482,915 A | 1/1996 | Golden et al. | |
| 5,538,929 A | 7/1996 | Sudhakar et al. | |
| 5,540,759 A | 7/1996 | Golden et al. | |
| 5,547,760 A | 8/1996 | Tarbet et al. ................ 428/471 |
| 5,614,459 A | 3/1997 | Mondragon et al. | |
| 5,710,092 A | 1/1998 | Baker | |
| 5,834,114 A | * 11/1998 | Economy et al. .......... 264/29.1 |
| 5,965,483 A | 10/1999 | Baker et al. | |
| 5,997,829 A | * 12/1999 | Sekine et al. ............... 423/210 |

FOREIGN PATENT DOCUMENTS

| | | |
|---|---|---|
| DE | 33 37 56 A1 | 5/1985 |
| DE | 3339756 A1 | 5/1985 |
| EP | 0 036 584 A2 | 9/1981 |
| EP | 0 045 824 A1 | 2/1982 |
| EP | 0 285 321 A2 | 10/1988 |
| EP | 0 608 539 A1 | 8/1994 |
| EP | 0 630 685 A1 * | 12/1994 |
| WO | WO 99/61384 | 12/1999 |

OTHER PUBLICATIONS

Search Report for Patent Cooperation Treaty application No. PCT/US 01/41081, Date of Mailing Nov. 9, 2001, 7 pages.

(List continued on next page.)

Primary Examiner—Shrive P. Beck
Assistant Examiner—Rebecca A. Blanton
(74) Attorney, Agent, or Firm—Sonnenschein Nath & Rosenthal

(57) ABSTRACT

A composite contains substrate fibers, and an activated organic coating, on the substrate fibers. The activated organic coating is formed at a low temperature, making possible the use of substrate fibers have a softening or decomposition temperature of at most 500° C.

20 Claims, 14 Drawing Sheets

OTHER PUBLICATIONS

Search Report for Patent Cooperation Treaty application No. PCT/US 01/19952, Date of Mailing Nov. 14, 2001, 8 pages.

Search Report for Patent Cooperation Treaty application No. PCT/US 01/19946, Date of Mailing Nov. 14, 2001, 8 pages.

Weiping Lin et al.—"Studies of the Preparation, Structure, and Properties of an Acrylic Chelating Fiber Containing Amidoxime Groups," Journal of Applied Polymer Science, vol. 47, pp. 45–52 (1993).

Weiping Lin et al.—"Extraction of Gold from Au(III) Ion Containing Solution by a Reactive Fiber", Journal fo Applied Polymer Science, vol. 49, pp. 1635–1638 (1993).

M. Molina–Sabio et al.—"Development of Porosity in Combined Phosphoric Acid–Carbon Dioxide Activation", Carbon, vol. 34, No. 4, pp. 457–462 (1996).

C. Toles et al.—"Production of Activated Carbons from a Washington Lignite Using Phosphoric Acid Activation", Carbon, vol. 34, No. 11, pp. 1419–1426, (1996).

W.H. Lee et al.—"Vapor adsorption on coal–and wood based chemically activated carbons (II) adsorption of arganic vapors", Carbon 37, pp. 15–20 (1999).

P.J.M. Carrott et al.—"Preparation of activated carbon 'membranes' by physical and chemical activation of cork", Carbon 37, pp. 515–517 (1998).

Marit Jactoyen et al.—"Some Considerations of the Origins of Porosity in Carbons from Chemically Activated Wood", Carbon, vol. 31, No. 7, pp. 1185–1192 (1993).

M. Molina–Sabio et al.—"Porosity in Granular Carbons Activated with Phosphoric Acid", Carbon, vol. 33, No. 8, pp. 1105–1113 (1995).

M.S. Solum et al.—"Evolution of Carbon Sturcture in Chemically Activated Wood", Carbon. vol. 33, No. 9. pp. 1247–1254 (1995).

E. Ahmadpour et al.—"The Preparation of Active Carbons from Coal from Coal by Chemical And Physical Activation", Carbon, vol. 34, No. 4, pp. 471–479 (1995).

* cited by examiner

ACTIVATED ORGANIC COATINGS ON A FIBER SUBSTRATE

FEDERALLY SPONSORED RESEARCH OR DEVELOPMENT

The subject matter of this application was in part funded by the DARPA/DSO (Grant no. BAA98-21; UFAS No. 1-5-49244). The government may have certain rights in this invention.

BACKGROUND

The present invention relates to activated coatings.

Activated carbon granules, produced from organic precursors such as coal, wood, nutshells, etc., or activated carbon fibers, produced from organic and synthetic precursors, have been used to remove contaminants from waste streams. The precursor is usually heated until carbonized, and then activated. Activation is achieved typically by heating the carbonized material in an oxidizing environment. Activated carbon typically contains at least 95 wt % carbon.

It is also known to chemically activate carbon, but this alternative method is usually limited to woody and coal precursors. This process involves carbonizing the parent material after impregnation, with, for example phosphoric acid, zinc chloride, or potassium hydroxide. In such an activation process, there is no direct solution or melting between parent material and chemical reagent, but primarily an impregnation process. Usually the temperature range for such activation is 600 to 900° C. and creates a pelletized product.

Activated carbon fibers, suffer from some disadvantages. For example, extreme weight loss results during the production of activated carbon fibers, limiting their cost-effectiveness. Furthermore, activated carbon fibers are usually brittle or frangible, due to producing these fibers by carbonization at high temperatures; these poor mechanical properties limit their utility to systems containing some sort of mechanical support, and make it difficult or expensive to produce forms such as woven fabrics, felts and papers.

Glass or mineral fibers, coated with activated carbon, have been prepared. For example, U.S. Pat. No. 5,834,114 describes glass or mineral fibers coated with activated carbon prepared by coating a glass or mineral fiber substrate with a resin, cross-linking the resin, heating the coated fiber substrate and resin to carbonize the resin, and exposing the coated fiber substrate to an etchant to activate the coated fiber substrate. Also, Unexamined German Patent no. 3,339,756 A1 describes fibers coated with activated carbon. The fibers are coated with a carbonizable substance optionally containing a dehydrating substance, and carbonized at 800–1100° C., and then formed into activated carbon by heating at a temperature of at least 750° C. in the presence of oxygen, ammonia, water vapor or carbon dioxide, or a mixture of these gases. If the carbonizable coating melts before carbonization, it may be heated in air or another oxidizing agent to approximately 200–300° C. to form an infusible layer, avoiding loss due to drippage during carbonization.

BRIEF SUMMARY

In a first aspect, the present invention includes a composite containing substrate fibers, and an activated organic coating, on the substrate fibers. The substrate fibers have a softening or decomposition temperature of at most 500° C.

In a second aspect, the present invention includes a method of making a composite, including heating a coating mixture, to form an activated organic coating. The coating mixture is on substrate fibers, and the coating mixture contains a polymeric material and an activating agent.

In a third aspect, the present invention includes a method of making a composite, including mixing together a set of ingredients to form a first mixture; coating substrate fibers with the first mixture; and heating the coating mixture, to form an activated organic coating. The set of ingredients contains a volatile solvent, a polymeric material, and an activating agent. The polymeric material is soluble in the volatile solvent, and the heating is at a temperature of 150–400° C.

In a fourth aspect, the present invention includes a composite, containing substrate fibers, and a coating, on the substrate fibers. The coating has a B.E.T. surface area of 50 to 1800 m$^2$/g, and a nitrogen content of 12 to 20 wt. %.

In a fifth aspect, the present invention includes a composite, containing substrate fibers, and a coating, on the substrate fibers. The coating has a B.E.T. surface area of at least 50 m$^2$/g, and a carbon content of at most 85 wt %.

The term "soluble" means that at least 0.1 mg of the solid will dissolve in 1 liter of the solvent at room temperature.

The term "volatile solvent" means that the solvent has a vapor pressure of at least 10 mTorr at 200° C.

The term "activated organic coating" means a material that contains carbon and has a B.E.T. surface area of at least 50 m$^2$/g.

The term "polymeric material" means a composition that contains at least one organic polymer.

The term "activating agent" means an acid or base, including Lewis acids and bases, that will convert a polymeric material into an activated organic coating upon heating to a temperature of 400° C. or less.

DETAILED DESCRIPTION

Figure 1:
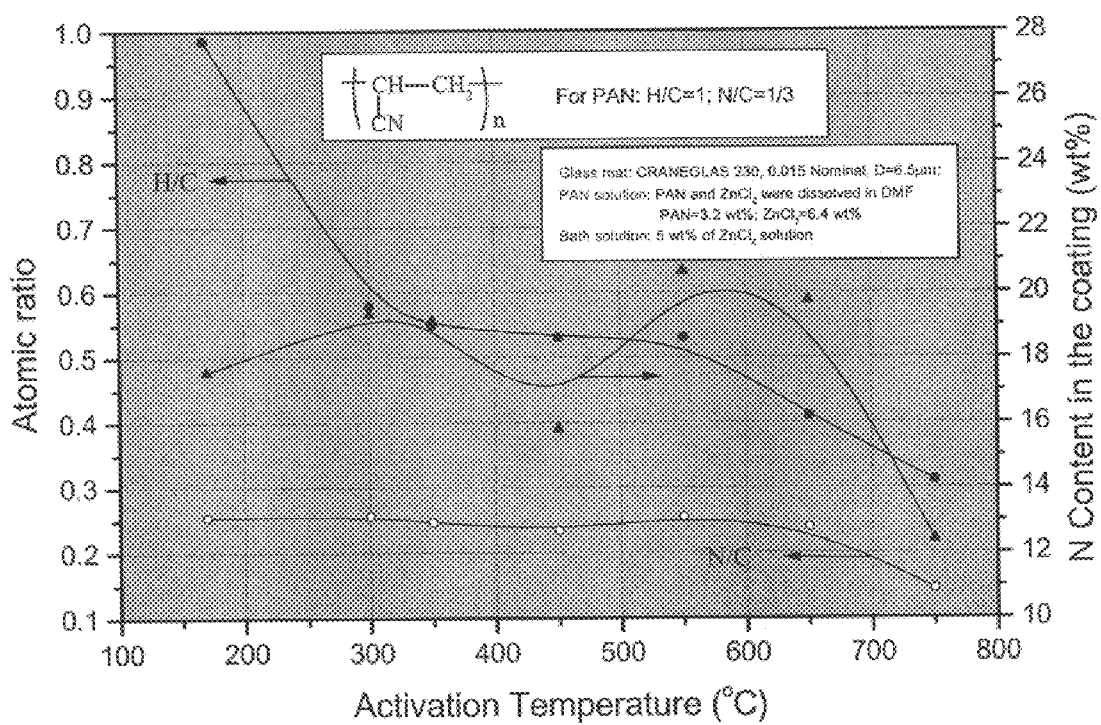
FIG. 1 is a graph illustrating the effect of temperature on H, C, and N content.

The activated organic coating composite fibers of the present invention exhibit notable advantages over current activated carbon materials. First, a wider range of fiber substrate materials may be used, offering greater versatility than activated carbon fibers. This includes low melting point glass fibers such as HEPA filters, allowing for potential adsorption/filtration in a single step, or even polymeric fibers. These last two materials lend themselves greatly to use in collective protection devices, such as gas masks and clothing. Furthermore, these new materials are far easier and less expensive to manufacture, due to the low temperature activation, higher yields and better mechanical integrity/wear resistance achieved compared to conventional activated carbon materials. In addition, by utilizing different starting polymers, a wide variety of chemically modified surfaces can be created which are capable of adsorbing/chelating many different contaminants from both air and water.

The activated organic coating composite fibers may be made by heating substrate fibers coated with a coating mixture containing an organic polymeric material, and a chemical activating agent. Preferably, the coating mixture has been cured or cross-linked. Heating is carried out to a temperature of 150 to 450° C., preferably 170 to 350° C.

The polymeric material may be any organic polymer that will react with a chemical activating agent to produce a coating having a surface area of at least 50 m$^2$/g, preferably having an average pore size of 5 to 35 Å. Prior to heating, the coating mixture has a surface area of at most 10 m$^2$/g. Preferably the polymeric material is soluble in a volatile solvent. Examples of polymeric materials include phenolic resins, poly(vinyl alcohol) (PVA), polyacrylonitrile (PAN), cellulose, polystyrene, polypropylene, poly(vinyl chloride) (PVC), poly(meth)acrylates and poly(meth)acrylic acids, as well as copolymers and mixtures thereof.

The activating agent reacts with the polymeric material to form the activated organic coating. The same activating agents used as chemical activating agents for activating activated carbon may be used, in particular acids and bases, including Lewis acids and bases. These chemical activating agents for activating activated carbon are described in U.S. Pat. No. 5,834,114, hereby incorporated by reference, as well as in "Tailoring Carbon Fibers for Adsorbing Volatiles" Economy, James, et al. CHEMTECH (1992), 22(10), 597–603.; "Properties of Sorption-Active Carbon Fibers" section 3.6 of Chemically Modified Carbon Fibers and Their Applications, Ermolenko, I. N.,et al., translated by Titovets, E. P., VCH Publishers, Inc., New York, 1990.; and "Surface Modification of Carbon Fibers" Chapter 6 of Chemically Modified Carbon Fibers and Their Applications, Ermolenko, I. N.,et al., translated by Titovets, E. P., VCH Publishers, Inc., New York, 1990. Specific examples include acids such as phosphoric acid, metal halides such as zinc chloride and hydroxides such as potassium hydroxide, sodium hydroxide. Other examples include Friedel-Crafts ; dehydrating agents; $TiCl_4$, $ZnBr_2$, $AlBr_3$, $AlCl_3$, $BF_3$, $CaO$, $Ca(OH)_2$, $H_2SO_4$, $Mg(OH)_2$, $MgO$ and $LiOH$. Mixtures of the metal salts; mixtures of the base; or mixtures of the acids are also possible. Preferably, 0.1 to 90 wt % of the activating agent is present in the coating mixture. As the amount of activating agent increases, so does the pore size of the resulting activated organic coating.

One method of forming the coating mixture on the substrate fibers is to first form the coating mixture by dissolving a polymeric material in a solvent, and mixing it with a chemical activating agent, and then applying the mixture to coat substrate fibers. Alternatively, the chemical activating agent may be applied to the substrate fiber, and then subsequently the polymeric material, dissolved in a solvent, is applied to coat the substrate fibers. The coated fiber is then exposed to air to drive off the excess solvent. The dried resin coating may then be cured or stabilized in air by heating, for example to about 165° C., to cross-linking the polymeric material. Optionally, the activating agent may also be applied after the polymeric material is applied to the fiber.

Suitable solvents are volatile solvent in which the polymeric material is soluble. Examples of volatile solvents include water; alcohols such as ethanol or methanol; dimethylformamide (DMF); dimethyl sulfoxide; hydrocarbons such as pentane, butane, pentane, hexane, toluene and xylene; ethers such as diethyl ether and tetrahydrofuran; ketones and aldehydes such as acetone and methyl ethyl ketone; acids such as acetic acid and formic acid; amines such as pyridine and hexamethylenetetramine; and halogenated solvents such as dichloromethane and carbon tetrachloride; as well as mixtures thereof.

A second method of forming the coating mixture on the substrate fibers starts with the formation of the polymeric material by polymerizing monomers, and the polymerization is stopped before the polymerizing mixture becomes a gel. The substrate fibers are then coated with the chemical activating agent, and then coated with the polymerizing mixture. Next, the coating mixture is cured by heating to complete the polymerization of the polymeric material. The viscosity of the polymerizing mixture may be adjusted with a solvent, so that the thickness of the coating on the fibers can be easily controlled.

Curing and activation may take place in one or more steps over a succession of temperatures, in order to increase the concentration of porosity in the coating and minimize the amount of coating that is volatilized. Optionally, the cured coating may be further activated to produce a higher surface area, by further heating in a flow of inert gas or air. Selection of the specific polymeric material, chemical activating agent and its concentration, along with the activation temperature and time, will determine the specific surface area, pore size distribution and surface chemistry of the activated organic coating. For example, very low activation temperatures can be used to produce high surface area activated organic coating composite fibers, when using substrate fibers containing polymers.

In a third method, the polymeric material is melted, and the melt is coated onto the fibers, after the activating agent has been coated onto the fibers or mixed into the melt of polymeric material. Optionally, the polymeric material may be exposed to a cross-linking agent, or exposed to radiation. Furthermore, the coated fibers may be made into a different form, such as a mat, using the resin as an adhesive to hold the coated fibers together, for example by pressing the coated fibers together while heating.

The yield of activated organic coating, based on the weight of the coating mixture, is usually much greater than typical yields achieved with activated carbon. Preferably, the yield of activated organic coating (the weight of activated organic coating divided by the weight of coating mixture) is preferably at least 50%, more preferably at least 60%, even more preferably at least 80%, and most preferably at least 90%.

The surface chemistry of the activated organic coating may be controlled to be acidic (for the adsorption of basic contaminants) or basic (for the adsorption of acidic contaminants). To form basic surface chemistry, nitrogen containing polymeric materials may be used, for example polyacrylonitrile (PAN), together with an activating agent, for example zinc chloride. Preferably, the coating mixture is heated to 300–400° C. for 2 minutes to 24 hours. The resulting assemblies have B.E.T. surface areas of from 400–1200 m$^2$/g and N content ranging from 12 to 20 wt % based upon the weight percent of activated organic coating. Optionally, much higher temperatures, up to 900° C., may be used for increased surface areas, but this results in a decreased N content.

Similarly, to form acidic surface chemistry, oxygen containing polymeric materials may be used, for example polyvinyl alcohol (PVA) or cellulose, together with an activating agent, for example phosphoric acid. Preferably, the coating mixture is heated to 150 to 300° C. for 2 minutes to 24 hours. The pore size increases with increased concentration of phosphoric acid. For example, a coating activated at 300° C. for 1 hour in air has a B.E.T. surface area of 1800 m$^2$/g. The use of air in the heated environment produces fibers with an activated organic coating that contains 10 to 24 wt % oxygen, based on the weight of the coating. In contrast, the preferable activation is temperature range currently for chemically activated carbons is 500 to 800° C., giving surface areas of approximately 1200 m$^2$/g.

The activated organic coating may include one or more catalytic materials that remain inert during processing but will catalyze the decomposition of toxic gases, such as those used in chemical warfare. Examples of catalysts include free metal or compounds of metals such as zinc, copper, platinum, palladium and titanium. Preferably, the metal is present as the free metal, or the oxide (such as zinc oxide or copper oxide). The catalyst may be applied by mixing it or a compound of the metal of the catalyst into the coating mixture, or after activation by coating the activated organic coating with a mixture of catalyst, or a compound containing the metal of the catalyst, and a solvent, and then vaporizing the solvent. For example, the metal of the catalyst may be applied as the chloride salt with a solvent, and then heated to remove the solvent and convert the chloride salt to an oxide or the free metal. Any volatile solvent capable of dispersing or dissolving the catalyst or a compound of the metal of the catalyst is suitable, for example water; alcohols such as ethanol or methanol; dimethylformamide; dimethyl sulfoxide; hydrocarbons such as pentane, butane, pentane, hexane, toluene and xylene; ethers such as diethyl ether and tetrahydrofuran; ketones and aldehydes such as acetone and methyl ethyl ketone; acids such as acetic acid and formic acid; and halogenated solvents such as dichloromethane and carbon tetrachloride; as well as mixtures thereof.

The activated organic coating contains carbon. The amount of carbon is less than the amount of carbon typically found in activated carbon. Preferably, the amount of carbon is preferably at most 85 wt %, more preferably at most 80 wt %. Even more preferably, the amount of carbon is 50 to 80 wt %, most preferably 60 to 75 wt %.

The substrate fibers may include any material that can tolerate the conditions necessary to form the activated organic coating. Since the temperatures used to form the activated organic coating composite fibers are much lower than the temperatures need to form activated carbon, fibers having a softening or decomposition temperature of at most 500° C., at most 400° C., or even at most 350° C. may be used. This includes fibers containing polymeric materials having softening or decomposition temperatures between 150 to 350° C., such as natural fibers, HEPA filters, synthetic fibers used in clothing, polyesters, polyethylene, polyethylene terephthalate, nylon 6, nylon 66, polypropylene, KEVLAR™, liquid crystalline polyesters, and syndiotactic polystyrene. Other examples include natural and synthetic fibers, for example: glass fibers such as e-glass fibers; mineral fibers such as asbestos and basalt; ceramic fibers such as $TiO_2$, SiC, and BN; metal fibers such as iron, nickel and platinum; polymer fibers such as TYVEK™; natural fibers such as cellulose and animal hair; and combinations thereof. Some preferred substrate fibers are listed in the table below.

| Company | Product Line | Description |
| --- | --- | --- |
| CRANE & CO. | Crane 230 (6.5 µm) | Non-woven Fiber Glass Mats |
|  | Crane 232 (7.5 µm) | Non-woven Fiber Glass Mats |
| FIBRE GLAST | 519 (0.75 oz.) | wovens |
|  | 573 (9 oz.) | wovens |
| HOLLINGSWORTH & VOSE | BG05095 HE1021 | glass paper or felts |
| JOHNS MANVILLE | 7529 (11 µm) | non-woven fiber glass mats |
| LYDALL MANNING | MANNIGLAS ® | non-woven fiber glass mats |
| DUPONT | TYVEK ® | HDPE Spun bonded paper |

The activated organic coating composite fibers may be present in any form. Examples include loose fibers, woven and non-woven fabrics, papers, felts and mats. The activated organic coating composite fibers may be made from substrate fibers already present in a specific form, or the activated organic coating composite fibers may first be prepared from loose substrate fibers, and made into the specific form.

The length of the activated organic coating composite fibers is not limited, and may be, for example, 0.01 mm to 100 m in length. The activated organic coating composite fibers may be prepared from longer substrate fibers, then cut or chopped. Furthermore, the diameter of the activated organic coating composite fibers is also not limited, and may be, for example 100 Å to 1 mm in diameter. The aspect ratio of the fibers is preferably at least 10.

The activated organic coating on the activated organic coating composite fibers may be present on isolated regions on the surface of the substrate fibers, may completely enclose the substrate fibers, or enclose all of the substrate fibers except the ends of the substrate fibers. For example, if the substrate fibers were completely enclosed by the activated organic coating, then chopping would result in the ends of the fibers being exposed.

The weight ratio between the activated organic coating and the substrate fibers in the activated organic coating composite fibers is not limited, but does affect final properties. For example, if the amount of activated organic coating is very large compared to the amount of substrate fibers, then the stiffness of the activated organic coating may reduce the flexibility of the activated organic coating composite fibers. Preferably, the activated organic coating composite fibers include 1 to 90% by weight of activated organic coating, more preferably 5 to 80% by weight of activated organic coating, including 20%, 30%, 40%, 50%, 60%, and 70% by weight of activated organic coating. These ratios may also be expressed as the fraction of the fiber diameter that is activated organic coating, when the activated organic coating surrounds at least the body of the fibers. Preferably, the activated organic coating is 10 to 90% of the substrate fiber diameter, more preferably 20 to 80% of the substrate fiber diameter, including 30%, 40%, 50%, 60% and 70% of the substrate fiber diameter.

EXAMPLES

The following examples and preparations are provided merely to further illustrate the invention. The scope of the invention is not construed as merely consisting of the following examples. In the figures, the term "ACF" means activated organic coating composite fibers.

Example 1

Effect of Temperature on H, C, and N Content

PAN and $ZnCl_2$ were dissolved in DMF, to give a mixture having a concentration of 3.2 wt % PAN and 6.4 wt % $ZnCl_2$. A glass mat composed of CRANEGLAS 230, (0.015 nominal, fiber diameter of 6.5 μm) was dip coated with the mixture. The coated fiber was passed through a 5 wt % of $ZnCl_2$ solution bath, then dried and stabilized at the temperature range from 170 to 250° C. for 6 h. The stabilized fiber was activated in $N_2$ flow at different temperatures for 30 min, then washed with $H_2O$ and HCl thoroughly and dried at 120° C. under vacuum. H, C and N contents were measured with an elemental analyzer and TGA (thermogavimetric analysis). The results are shown in FIG. 1.

Example 2

Effect of Activation Temperature on Surface Area

Figure 2:
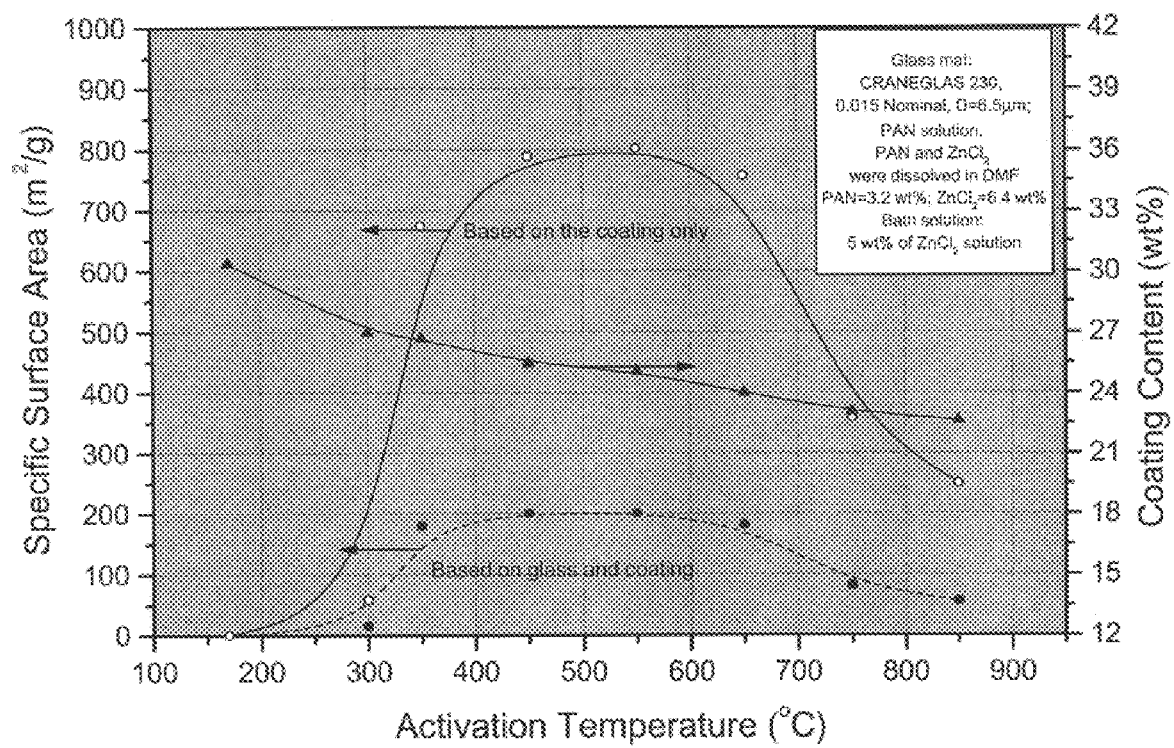
FIG. 2 is a graph illustrating the effect of activation temperature on specific surface area.

PAN and $ZnCl_2$ were dissolved in DMF, to give a mixture having a concentration of 3.2 wt % PAN and 6.4 wt % $ZnCl_2$. A glass mat composed of CRANEGLAS 230, (0.015 nominal, fiber diameter of 6.5 μm) was dip coated with the mixture. The coated fiber was passed through a 5 wt % of $ZnCl_2$ solution bath, then dried and stabilized at the temperature range from 170 to 250° C. for 6 h. The stabilized fiber was activated in $N_2$ flow at different temperatures for 30 min, then washed with $H_2O$ and HCl thoroughly and dried at 120° C. under vacuum. $N_2$ BET surface area was measured with a QUANTACHROME AUTOSORB-1 and the coating content was measured with TGA. The results are shown in FIG. 2.

Example 3

Effect of $ZnCl_2$ Concentration on Specific Surface Area

Figure 3:
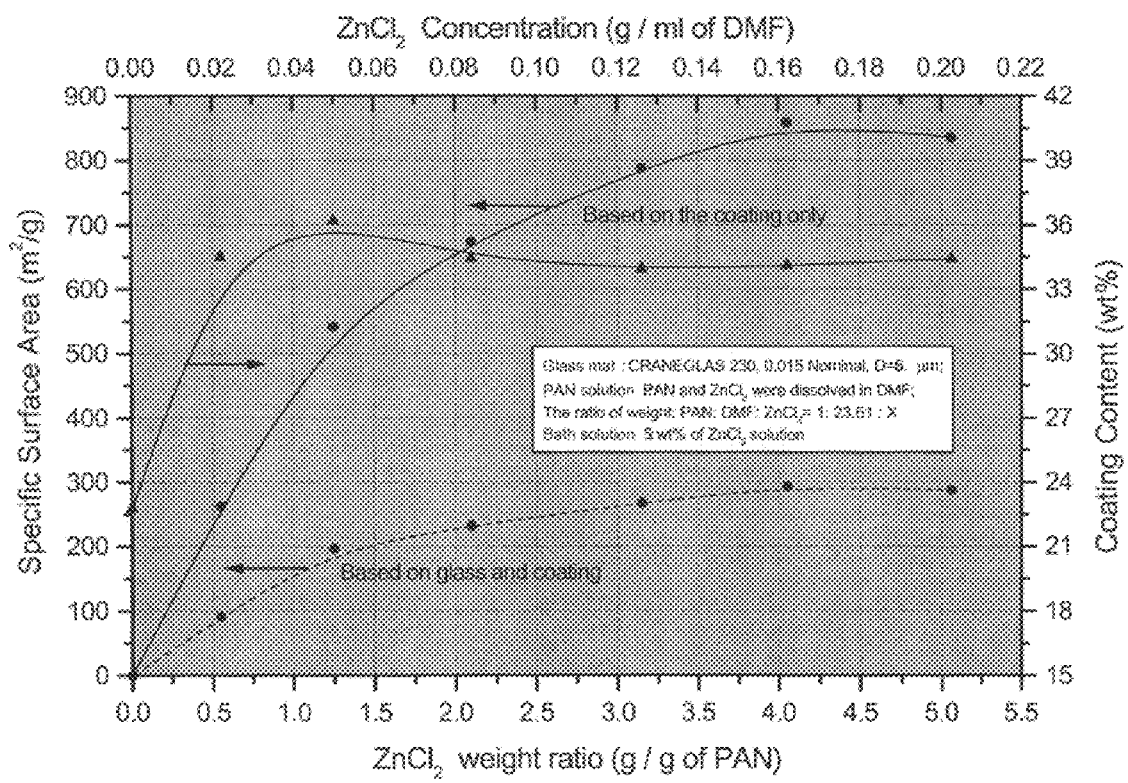
FIG. 3 is a graph illustrating the effect of activating agent concentration on specific surface area.

PAN and $ZnCl_2$ were dissolved in DMF, to give different mixtures having a ratio of weight of PAN: DMF: $ZnCl_2$=1: 23.61: X, where X is the $ZnCl_2$ concentrations shown in FIG. 3. A glass mat composed of CRANEGLAS 230, (0.015 nominal, fiber diameter of 6.5 μm) was dip coated with these mixtures. The coated fiber was passed through a 5 wt % of $ZnCl_2$ solution bath. Then dried and stabilized at the temperature range from 170 to 250° C. for 6 h. The stabilized fiber was activated in $N_2$ flow at 350° C. for 30 min, then washed with $H_2O$ and HCl thoroughly and dried at 120° C. under vacuum. $N_2$ BET surface area was measured with QUANTACHROME AUTOSORB-1 and the coating content was measured with TGA. The results are shown in FIG. 3.

Example 4

HCl Uptake onto PAN-based Activated Organic Coating Composite Fibers

Figure 4:
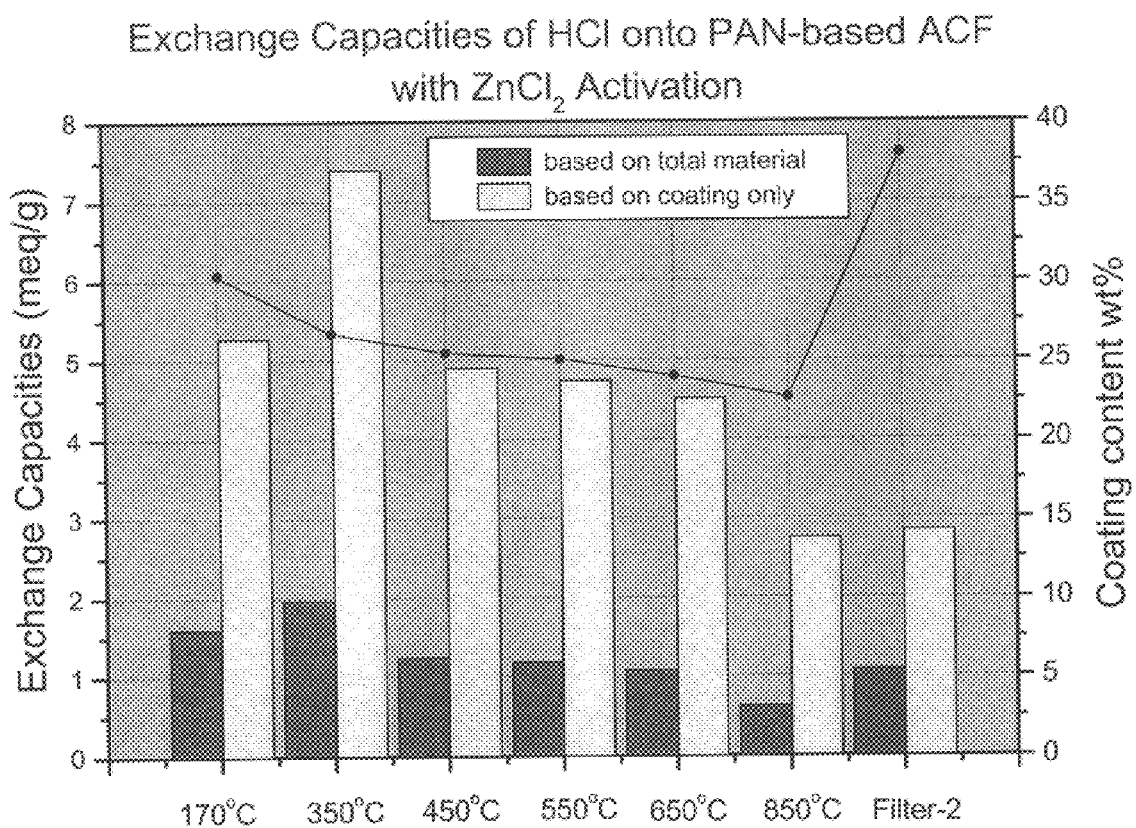
FIG. 4 is a graph illustrating exchange capacities of HCl onto PAN-based activated coating fibers with ZnCl$_2$ as the activating agent.

About 0.02–0.04 g of PAN-based activated organic coating composite fibers from different activation temperatures shown in Example 2 were added into 20 ml of HCl solution (0.01N). The mixture was shaken at room temperature for 24 h, and then the change in pH of samples and control solution was measured with a pH meter. HCl uptake was calculated. The results are shown in FIG. 4.

Example 5

Effect of KOH Concentration on Surface Area

Figure 5:
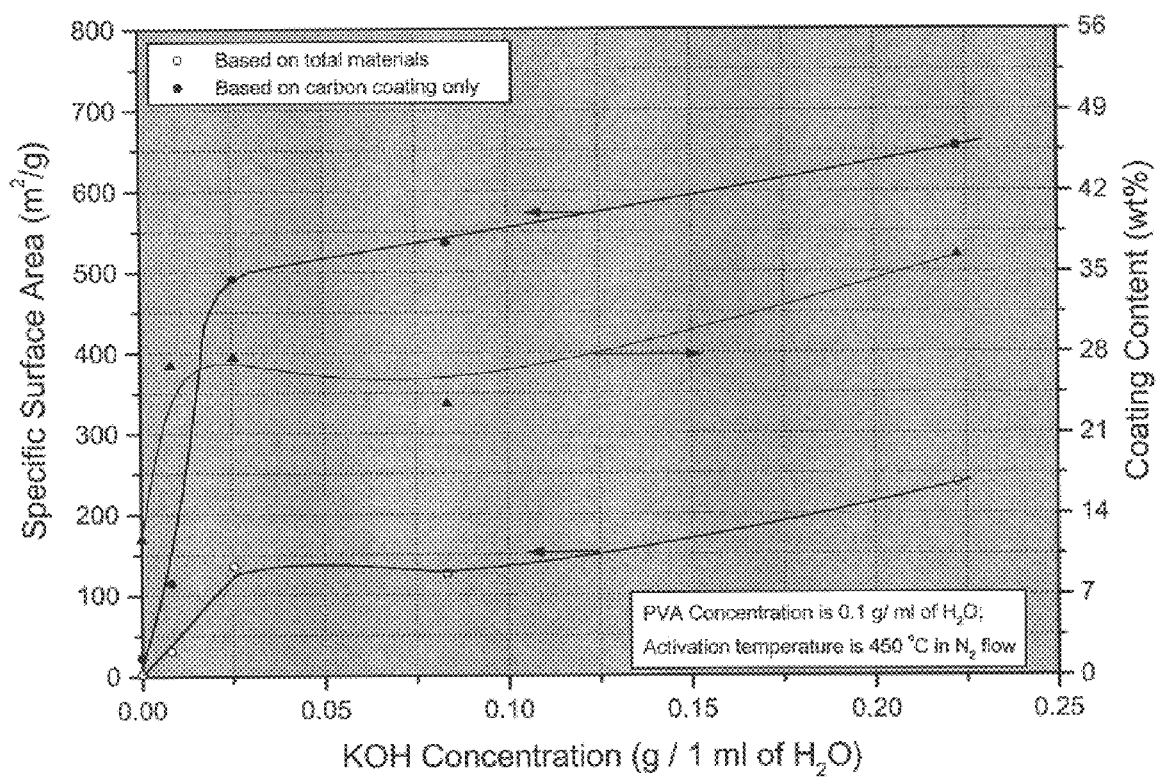
FIG. 5 is a graph illustrating the effect of activating agent concentration on surface area.

PVA and KOH were dissolved in water, to give different mixtures having a concentration of 0.1 g PVA/ml of $H_2O$ and different KOH concentration. A glass mat composed of CRANEGLAS 230, (0.015 nominal, fiber diameter of 6.5 μm) was dip coated with these mixtures, then dried and stabilized at 170° C. for 6 h. The stabilized fiber was activated in $N_2$ flow at 450° C. for 30 min, then washed with $H_2O$ and HCl thoroughly and dried at 120° C. under vacuum. $N_2$ BET surface area was measured with a QUANTACHROME AUTOSORB-1 and coating content was measured with TGA. The results are shown in FIG. 5.

Example 6

Effect of Activation Temperature on Surface Area

Figure 6:
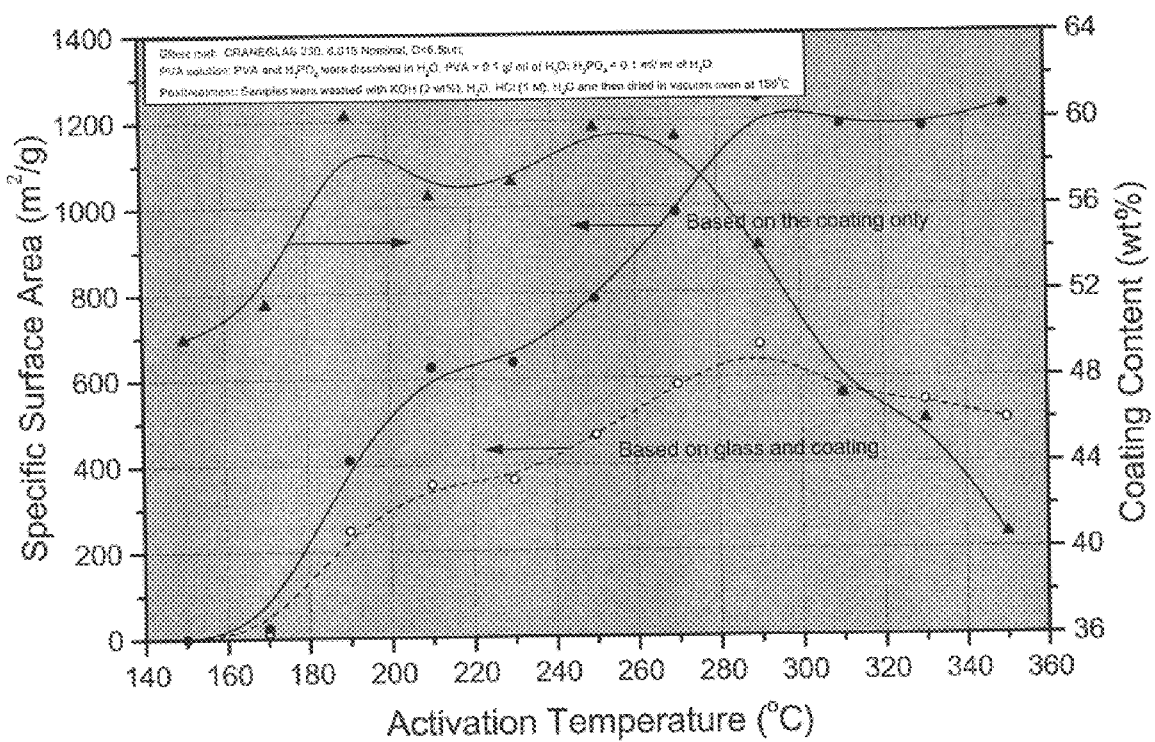
FIG. 6 is a graph illustrating the effect of activation temperature on specific surface area.

PVA and $H_3PO_4$ were dissolved in water, to give a mixture having a concentration of 0.1 g PVA/ml of $H_2O$ and 0.1 ml $H_3PO_4$ (85.9%)/ml of $H_2O$. A glass mat composed of CRANEGLAS 230, (0.015 nominal, fiber diameter of 6.5 μm) was dip coated with the mixture, and then dried and stabilized at 120° C. for 6 h. The stabilized fiber was activated in the air at different temperatures for 10 min, then washed with $H_2O$, NaOH (or KOH) (2 wt %), $H_2O$ and HCl (0.5 M) thoroughly and dried at 150° C. under vacuum. $N_2$ BET surface area was measured with a QUANTACHROME AUTOSORB-1 and the coating content was measured with TGA. The results are shown in FIG. 6.

Example 7

Effect of $H_3PO_4$ Concentration on Surface Area

Figure 7:
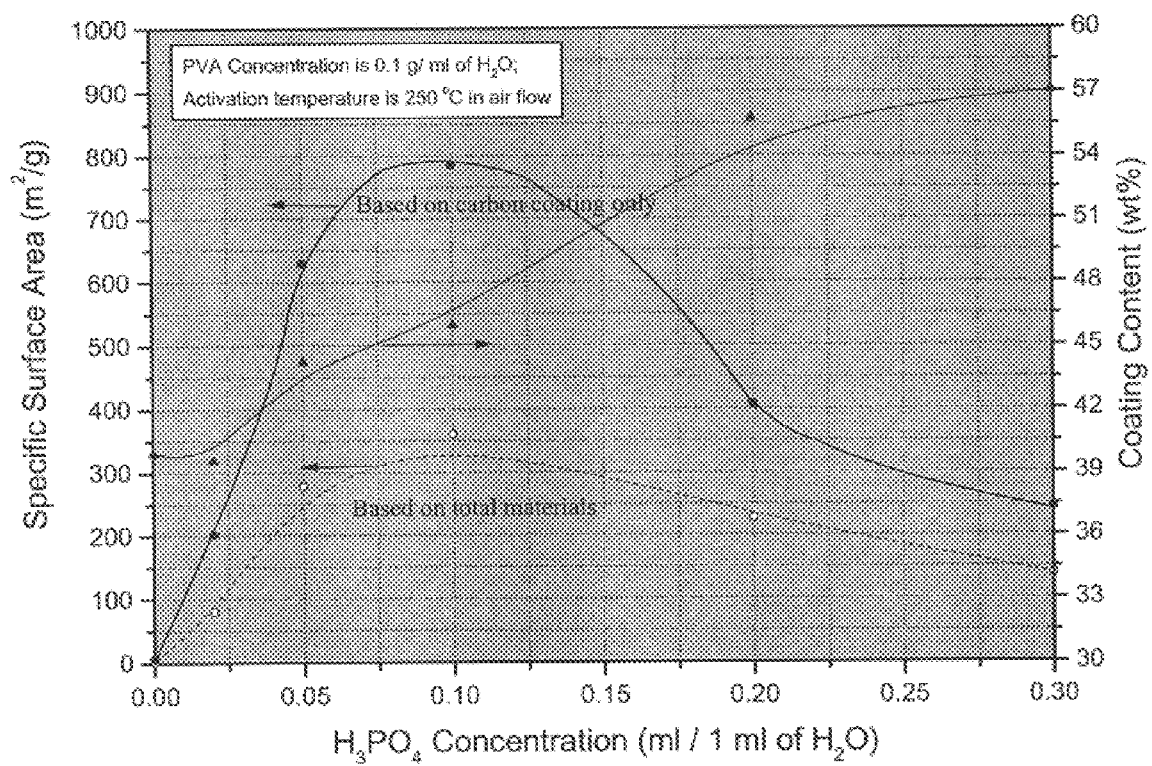
FIG. 7 is a graph illustrating the effect of activating agent concentration on surface area.

PVA and $H_3PO_4$ were dissolved in water, to give different mixtures having a concentration of 0.1 g PVA/ml of $H_2O$ and different $H_3PO_4$ concentrations. A glass mat composed of CRANEGLAS 230, (0.015 nominal, fiber diameter of 6.5 μm) was dip coated with these mixtures, and then dried and stabilized at 120° C. for 6 h. The stabilized fiber was activated in air at 250° C. for 10 min, then washed with $H_2O$, NaOH (or KOH) (2 wt %), $H_2O$ and HCl (0.5 M) thoroughly and dried at 150° C. under vacuum. $N_2$ BET surface area was measured with a QUANTACHROME AUTOSORB-1 and the coating content was measured with TGA. The results are shown in FIG. 7.

Example 8

Effect of Activation Time on Surface Area

Figure 8:
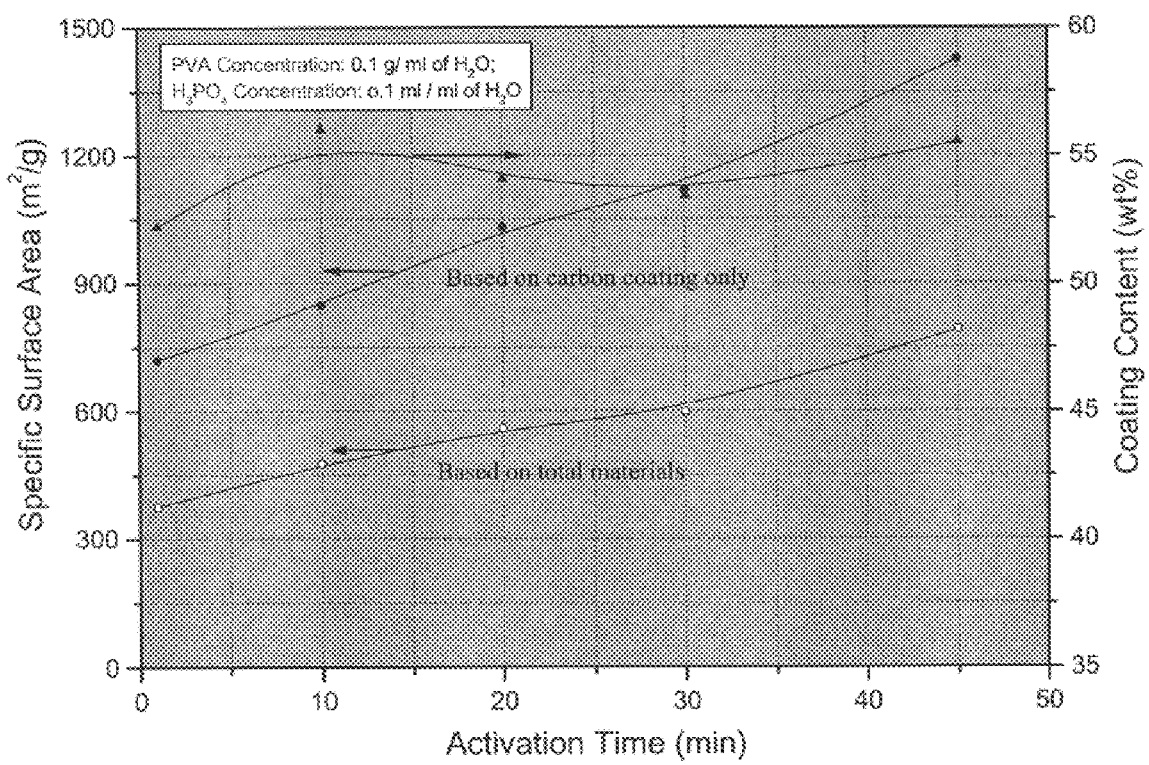
FIG. 8 is a graph illustrating the effect of activation time on surface area.

PVA and $H_3PO_4$ were dissolved in water, to give a mixture having a concentration of 0.1 g PVA/ml of $H_2O$ and 0.1 ml $H_3PO_4$ (85.9%)/ml of $H_2O$. A glass mat composed of CRANEGLAS 230, (0.015 nominal, fiber diameter of 6.5 µm) was dip coated with the mixture, and then dried and stabilized at 120° C. for 6 h. The stabilized fiber was activated in air at 300° C. for different times, then washed with $H_2O$, NaOH (or KOH) (2 wt %), $H_2O$ and HCl (0.5 M) thoroughly and dried at 150° C. under vacuum. $N_2$ BET surface area was measured with a QUANTACHROME AUTOSORB-1 and the coating content was measured with TGA. The results are shown in FIG. 8.

Example 9

Effect of $ZnCl_2$ Concentration on Surface Area

Figure 9:
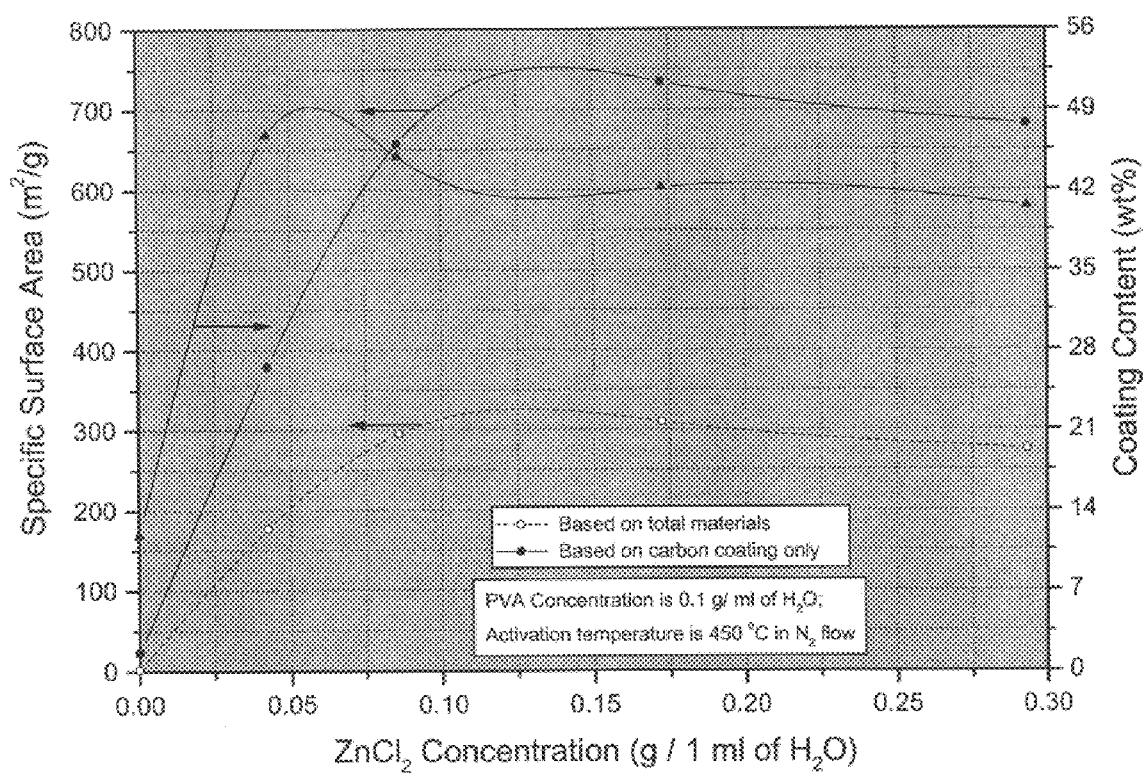
FIG. 9 is a graph illustrating the effect of activating agent concentration on surface area.

PVA and $ZnCl_2$ were dissolved in water, to give different mixtures having a concentration of 0.1 g PVA/ml of $H_2O$ and different $ZnCl_2$ concentrations. A glass mat composed of CRANEGLAS 230, (0.015 nominal, fiber diameter of 6.5 µm) was dip coated with these mixtures, and then dried and stabilized at 170° C. for 6 h. The stabilized fiber was activated in $N_2$ at 450° C. for 30 min, then washed with $H_2O$, and HCl (0.5 M) thoroughly and dried at 150° C. under vacuum. $N_2$ BET surface area was measured with a QUANTACHROME AUTOSORB-1 and the coating content was measured with TGA. The results are shown in FIG. 9.

Example 10

Effect of Activation Temperature on H, C and O Content

Figure 10:
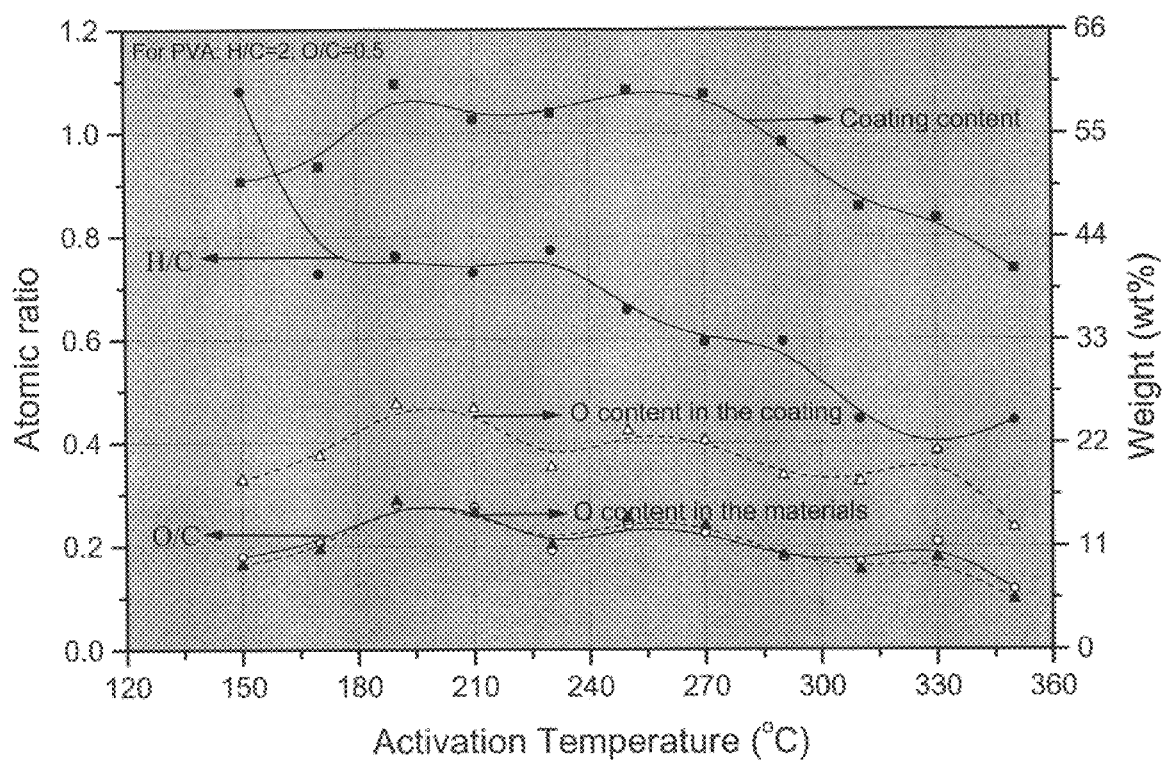
FIG. 10 is a graph illustrating the effect of activation temperature on the H, O and C content.

PVA and $H_3PO_4$ were dissolved in water, to give a mixture having a concentration of 0.1 g PVA/ml of $H_2O$ and 0.1 ml $H_3PO_4$ (85.9%)/ml of $H_2O$. A glass mat composed of CRANEGLAS 230, (0.015 nominal, fiber diameter of 6.5 µm) was dip coated with the mixture, and then dried and stabilized at 120° C. for 6 h. The stabilized fiber was activated in air at different temperatures for 10 min, then washed with $H_2O$, NaOH (or KOH) (2 wt %), $H_2O$ and HCl (0.5 M) thoroughly and dried at 150° C. under vacuum. H, C and O contents were measured with an elemental analyzer and TGA. The results are shown in FIG. 10.

Example 11

Effect of Activation Temperature on Surface Area

Figure 11:
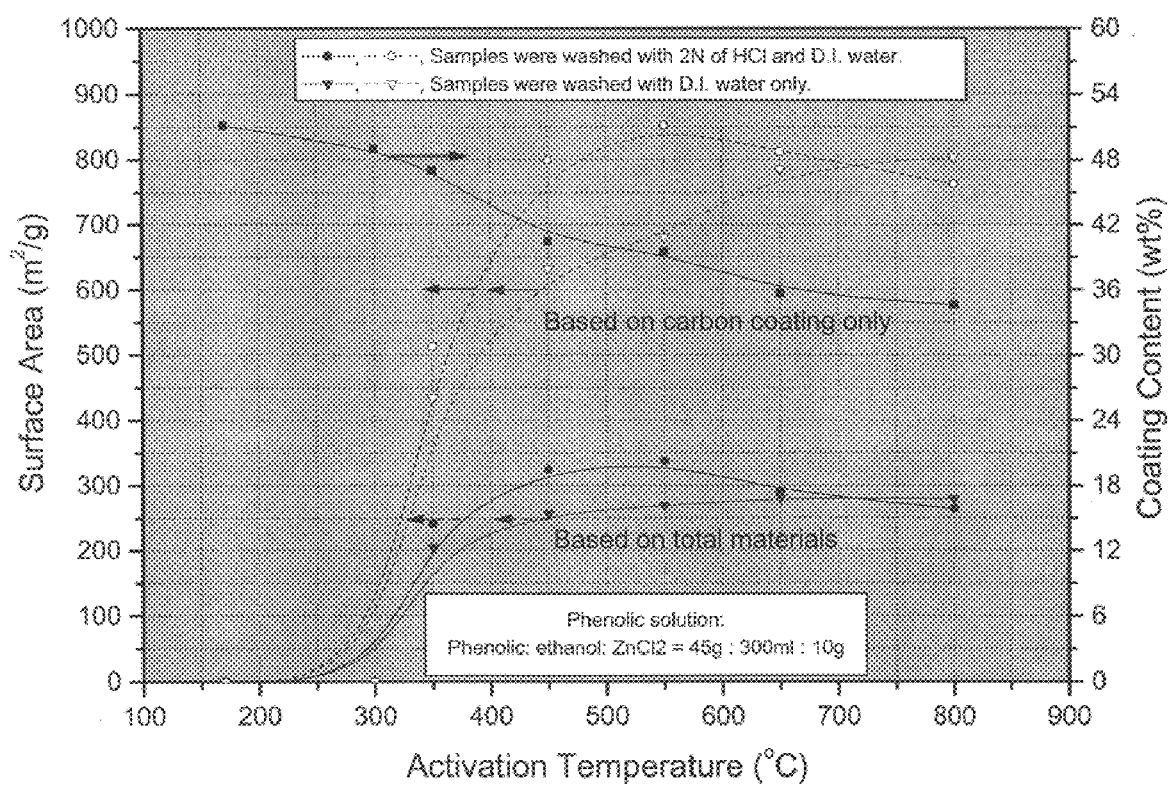
FIG. 11 is a graph illustrating the effect of activation temperature on surface area.

Phenolic resin and $ZnCl_2$ were dissolved in ethanol, to give a mixture having a concentration of Phenolic: ethanol: $ZnCl_2$=45 g: 300 ml: 10 g. A glass mat composed of CRANEGLAS 230, (0.015 nominal, fiber diameter of 6.5 µm) was dip coated with the mixture, and then dried and stabilized at 150° C. for 6 h. The stabilized fiber was activated in $N_2$ at different temperatures for 30 min, then washed with $H_2O$, and (or) HCl (0.5 M) thoroughly and dried at 150° C. under vacuum. $N_2$ BET surface area was measured with a QUANTACHROME AUTOSORB-1 and the coating content was measured with TGA. The results are shown in FIG. 11.

Example 12

Effect of $ZnCl_2$ Concentration on Surface Area

Figure 12:
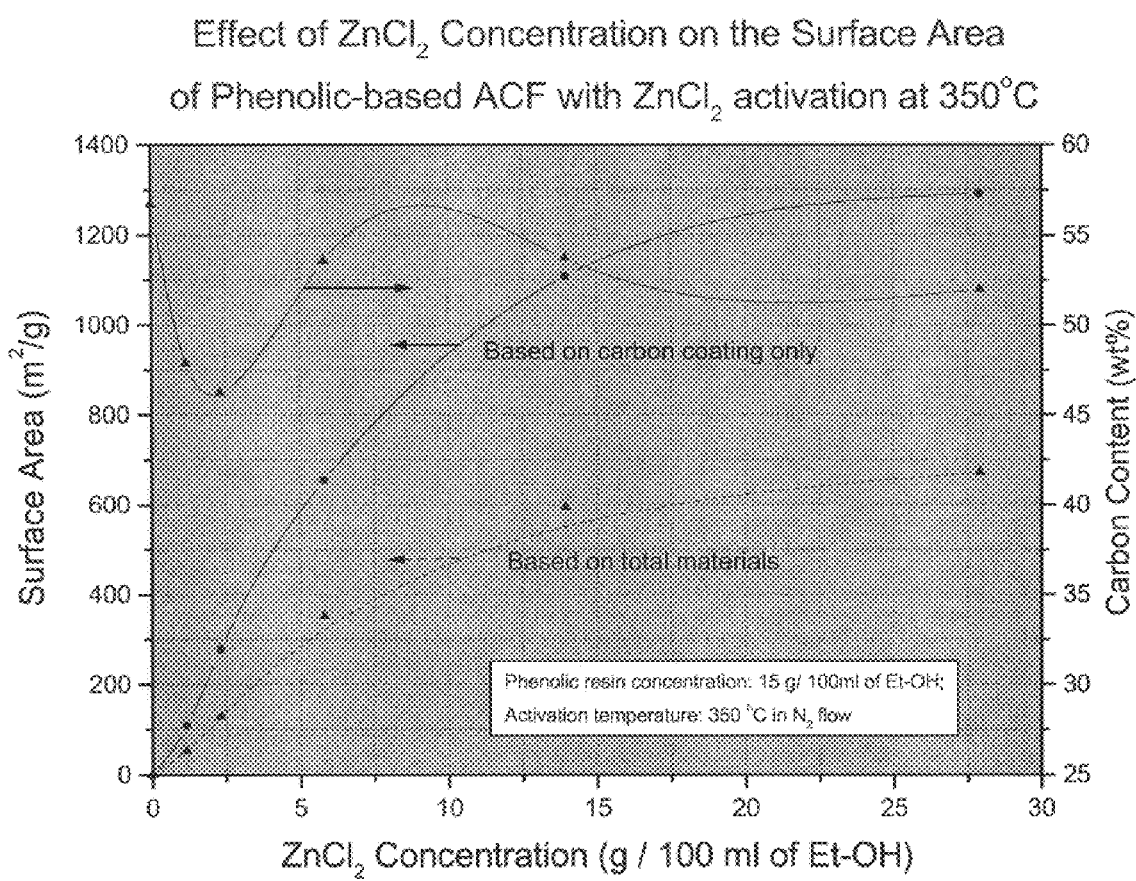
FIG. 12 is a graph illustrating the effect of activating agent concentration on surface area.

Phenolic resin and $ZnCl_2$ were dissolved in ethanol, to give different mixtures having a concentration of 15 g phenolic/100 ml of ethanol and different $ZnCl_2$ concentrations. A glass mat composed of CRANEGLAS 230, (0.015 nominal, fiber diameter of 6.5 µm) was dip coated with these mixtures, and then dried and stabilized at 150° C. for 6 h. The stabilized fiber was activated in $N_2$ at 350° C. for 30 min, then washed with $H_2O$, and HCl (0.5 M) thoroughly and dried at 150° C. under vacuum. $N_2$ BET surface area was measured with a QUANTACHROME AUTOSORB-1 and the coating content was measured with TGA. The results are shown in FIG. 12.

Example 13

Effect of Cellulose Concentration on Surface Area

Figure 13:
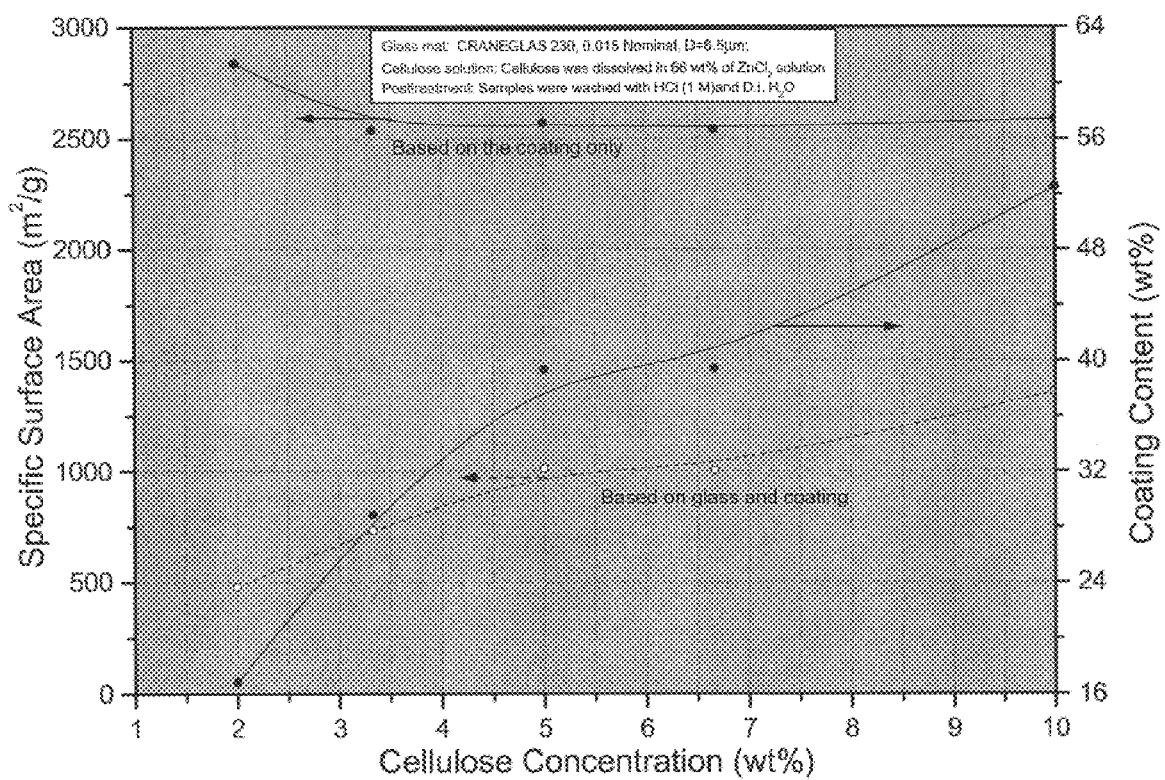
FIG. 13 is a graph illustrating the specific area of cellulose-based activated coating fibers with ZnCl$_2$ activation at 400° C. in N$_2$.

Cellulose was dissolved in a concentrated $ZnCl_2$ (66 wt %) solution, to give mixtures having different cellulose concentrations. A glass mat composed of CRANEGLAS 230, (0.015 nominal, fiber diameter of 6.5 µm) was dip coated with these mixtures, and then dried and stabilized at 150° C. for 6 h. The stabilized fiber was activated in $N_2$ at 400° C. for 30 min, then washed with $H_2O$, and (or) HCl (0.5 M) thoroughly and dried at 150° C. under vacuum. $N_2$ BET surface area was measured with a QUANTACHROME AUTOSORB-1 and the coating content was measured with TGA. The results are shown in FIG. 13.

Example 14

Effect of $H_3PO_4$ Concentration on Surface Area

Figure 14:
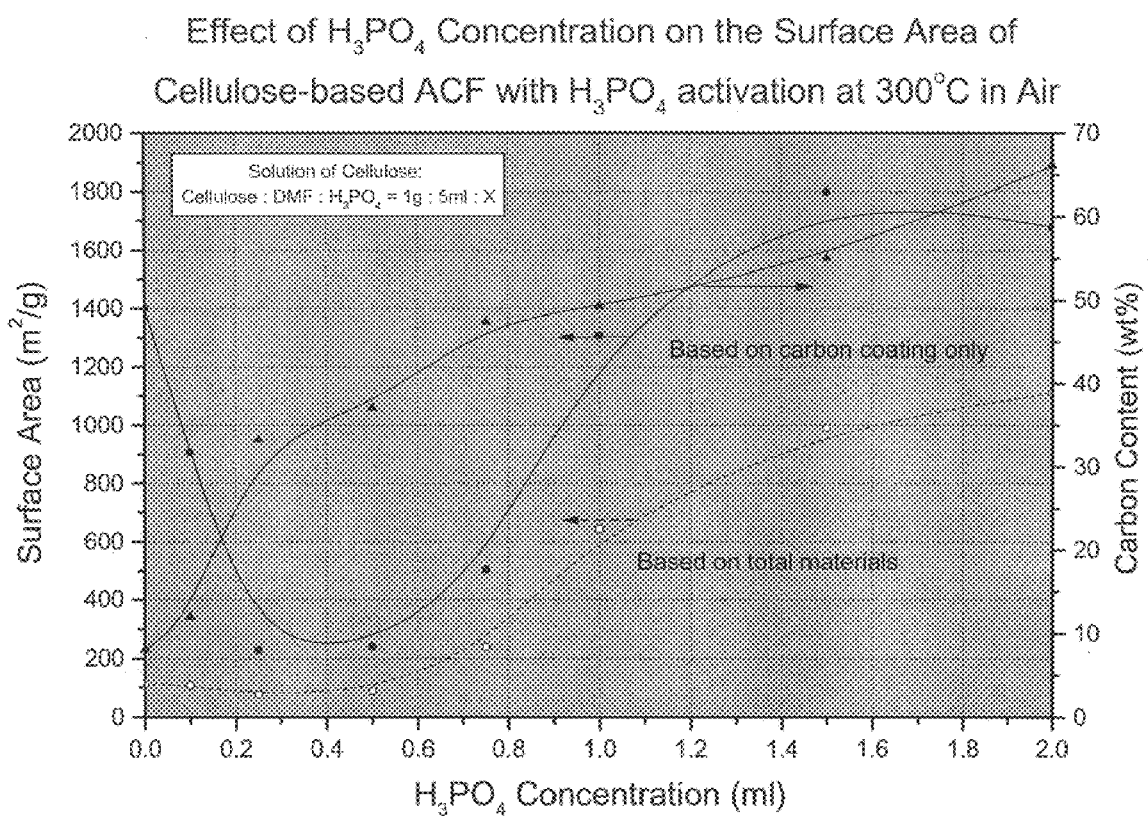
FIG. 14 is a graph illustrating the effect of activating agent concentration on surface area.

Cellulose and $H_3PO_4$ were dissolved in DMF, to give different mixtures having a concentration of Cellulose: DMF: $H_3PO_4$=1 g: 5 ml: X, where X is to the $H_3PO_4$ concentrations shown in FIG. 14. A glass mat composed of CRANEGLAS 230, (0.015 nominal, fiber diameter of 6.5 µm) was dip coated with these mixtures, and then dried and stabilized at 150° C. for 6 h. The stabilized fiber was activated in the air at 300° C. for 30 min, then washed with $H_2O$, NaOH (or KOH) (2 wt %), $H_2O$ and HCl (0.5 M) thoroughly and dried at 150° C. under vacuum. $N_2$ BET surface area was measured with a QUANTACHROME AUTOSORB-1 and the coating content was measured with TGA. The results are shown in FIG. 14.

Obviously, numerous modifications and variations of the present invention are possible in light of the above teachings. It is therefore to be understood that within the scope of the appended claims, the invention may be practiced otherwise than as specifically described herein.

What is claimed is:

1. A method of making a composite, comprising:
   heating a coating mixture, to form an activated organic coating;
   wherein said coating mixture is on substrate fibers, and said coating mixture comprises
   (a) a polymeric material, and
   (b) an activating agent; and
   wherein said heating is to a temperature of at most 450° C., and
   said substrate fibers have a softening or decomposition temperature of at most 350° C.

2. The method of claim 1, further comprising, prior to said heating:
   mixing together a set of ingredients to form a first mixture, said set of ingredients comprising
   (1) a volatile solvent,
   (2) said polymeric material, and
   (3) said activating agent; and
   coating said substrate fibers with said first mixture, to form said coating mixture;
   wherein said polymeric material is soluble in said volatile solvent.

3. The method of claim 1, wherein said polymeric material is selected from the group consisting of phenolic resins, poly(vinyl alcohol), polyacrylonitrile, cellulose, polystyrene, ploypropylenr, poly(vinyl chloride), poly(meth)acrylates, poly(meth)acrylic acids, copolymers thereof, and mixtures thereof.

4. The method of claim 1, wherein said heating is to a temperature of 150 to 350° C.

5. The method of claim 1, wherein said volatile solvent is selected from the group consisting of water, alcohols, dimethylformamide, dimethyl sulfoxide, ethers, ketones, aldehydes, and mixtures thereof.

6. The method of claim 1, wherein said substrate fibers have a softening or decomposition temperature of 150 to 350° C.

7. The method of claim 1, wherein said substrate fibers comprise glass.

8. The method of claim 1, wherein said substrate fibers are in the form of one member selected from the group consisting of fabrics, papers, felts and mats.

9. The method of claim 1, wherein said substrate fibers comprise a polymer.

10. The method of claim 1, wherein said activated organic coating has a B.E.T. surface area of at least 100 m$^2$/g.

11. A method of making a composite, comprising:
   mixing together a set of ingredients to form a first mixture, said set of ingredients comprising
   (1) a volatile solvent,
   (2) a polymeric material, and
   (3) an activating agent;
   coating substrate fibers with said first mixture to form a coating mixture, and
   heating said coating mixture, to form an activated organic coating;
   wherein said polymeric material is soluble is said volatile solvent,
   said heating is at a temperature of 150–450° C., and
   said substrate fibers have a softening or decomposition temperature of at most 350° C.

12. The method of claim 11, wherein said polymeric material is selected from the group consisting of phenolic resins, poly(vinyl alcohol), polyacrylonitrile, cellulose, polystyrene, polypropylene, poly(vinyl chloride), poly(meth)acrylates, poly(meth)acrylic acids, copolymers thereof, and mixtures thereof.

13. The method of claim 11, wherein said volatile solvent is selected from the group consisting of water, alcohols, dimethylformamide, dimethyl sulfoxide, ethers, ketones, aldehydes, and mixtures thereof.

14. The method of claim 11, wherein said substrate fibers have a softening or decomposition temperature of 150 to 350° C.

15. The method of claim 11, wherein said substrate fibers comprise glass.

16. The method of claim 11, wherein said substrate fibers are in the form of one member selected from the group consisting of fabrics, papers, felts and mats.

17. The method of claim 11, wherein said substrate fibers comprise a polymer.

18. A method of making the composite, comprising:
   mixing together a set of ingredients to form a first mixture, said set of ingredients comprising
   (1) a volatile solvent,
   (2) a polymeric material, and
   (3) an activating agent;
   coating substrate fibers with said first mixture to form a coating mixture; and
   heating said coating mixture, to form said coating;
   wherein said polymeric material is soluble in said volatile solvent,
   said heating is at a temperature at most 450° C.,
   said activating agent comprises zinc chloride, and
   said polymeric material comprises at least one member selected from the group consisting of polyacrylonitrile, copolymers thereof and mixtures thereof; and
   wherein said composite comprises
   (i) substrate fibers, and
   (i) a coating, on said substrate fibers,
   wherein said coating has a B.E.T. surface area of 400 to 1200 m$^2$/g, and a nitrogen content of 12 to 20 wt. %.

19. The method of claim 18, wherein said substrate fibers comprise at least one member selected from the group consisting of glass and polymer.

20. The method of claim 18, wherein said substrate fibers have a softening or decomposition temperature of at most 500° C.

* * * * *

UNITED STATES PATENT AND TRADEMARK OFFICE
CERTIFICATE OF CORRECTION

PATENT NO. : 6,517,906 B1
DATED : February 11, 2003
INVENTOR(S) : James Economy et al.

It is certified that error appears in the above-identified patent and that said Letters Patent is hereby corrected as shown below:

Column 11,
Line 4, delete "ploypropylenr" and substitute -- polypropylene --.
Line 36, delete the second occurrence of "is" and substitute -- in --.

Column 12,
Line 37, delete "(i)" and substitute -- (ii) --.

Signed and Sealed this

Ninth Day of September, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,517,906 B1
DATED        : February 11, 2003
INVENTOR(S)  : James Economy et al.

It is certified that error appears in the above-identified patent and that said Letters Patent is hereby corrected as shown below:

Title page
Item [73], Assignee, after "Board of Trustees of University of Illinois, Urbana, IL (US)", please insert -- and EKOS Materials Corporation, Savoy, IL (US) --.

Signed and Sealed this

Eighteenth Day of May, 2004

JON W. DUDAS
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 6,517,906 B1 | Page 1 of 1 |
| APPLICATION NO. | : 09/599084 | |
| DATED | : February 11, 2003 | |
| INVENTOR(S) | : Economy et al. | |

It is certified that error appears in the above-identified patent and that said Letters Patent is hereby corrected as shown below:

Col. 1, lines 5-8, delete "The subject matter of this application was in part funded by the DARPA/DSO (Grant no. BAA98-21; UFAS No. 1-5-49244). The government may have certain rights in this invention." and insert --This invention was made with Government Support under contract DAAH01-99-C-R175 awarded by the U.S. Army Aviation and Missile Command. The government has certain rights in the invention.--

Signed and Sealed this

Third Day of October, 2006

JON W. DUDAS
*Director of the United States Patent and Trademark Office*